United States Patent
Tracy (10) Patent No.: US 7,947,318 B2
(45) Date of Patent: May 24, 2011

(54) FLAVOR FRESH

(76) Inventor: John Martin Tracy, Burbank, CA (US)

(*) Notice: Subject to any disclaimer, the term of this patent is extended or adjusted under 35 U.S.C. 154(b) by 0 days.

(21) Appl. No.: 12/655,638

(22) Filed: Mar. 22, 2010

(65) Prior Publication Data
US 2010/0189849 A1   Jul. 29, 2010

Related U.S. Application Data

(60) Provisional application No. 61/204,298, filed on Jan. 6, 2009.

(51) Int. Cl.
A23B 7/148 (2006.01)

(52) U.S. Cl. ........ 426/231; 426/319; 426/320; 426/419; 454/83; 454/88

(58) Field of Classification Search .................. 426/231, 426/312–320, 418–419; 99/468, 473–481; 220/1.5; 454/83, 88, 90–92
See application file for complete search history.

(56) References Cited

U.S. PATENT DOCUMENTS

| | | | | | |
|---|---|---|---|---|---|
| 4,829,774 | A | * | 5/1989 | Wassibauer et al. | 62/78 |
| 4,833,892 | A | * | 5/1989 | Wassibauer et al. | 62/78 |
| 5,152,966 | A | * | 10/1992 | Roe et al. | 422/111 |
| 5,308,382 | A | * | 5/1994 | Prasad | 95/12 |
| 5,451,248 | A | * | 9/1995 | Sadkowski et al. | 95/99 |
| 5,658,607 | A | * | 8/1997 | Herdeman | 426/263 |
| 6,113,671 | A | * | 9/2000 | Garrett | 95/98 |
| 6,390,378 | B1 | * | 5/2002 | Briscoe et al. | 236/44 C |
| 6,460,352 | B1 | * | 10/2002 | Lemcoff et al. | 62/78 |
| 6,595,847 | B1 | * | 7/2003 | Freese et al. | 454/118 |
| 7,389,722 | B2 | * | 6/2008 | Brown | 99/468 |
| 7,866,258 | B2 | * | 1/2011 | Jorgensen et al. | 99/468 |
| 2004/0131736 | A1 | * | 7/2004 | Pan et al. | 426/419 |
| 2007/0065546 | A1 | * | 3/2007 | Jorgensen et al. | 426/316 |
| 2008/0017045 | A1 | * | 1/2008 | McGuire | 99/323 |
| 2009/0211298 | A1 | * | 8/2009 | Saul | 62/640 |
| 2010/0269525 | A1 | * | 10/2010 | Wang | 62/179 |

* cited by examiner

Primary Examiner — Drew E Becker

(57) ABSTRACT

A method for maintaining produce in a near "just harvested" state during transport in a truck trailer by limiting the formation of Ethylene, scrubbing the atmosphere to remove any that does form, and by exhausting the atmosphere of any residual Ethylene. The system will also limit the amount of Oxygen and Carbon Dioxide to preset limits, and exhaust the excess.

6 Claims, 4 Drawing Sheets

FLAVOR FRESH

CLAIM OF PRIORITY

This application claims benefit to U.S. Provisional Application No. 61/204,298 filed Jan 6, 2009, which is hereby incorporated by reference in its entirety.

| US PATENT DOCUMENTS | | REFERENCES |
|---|---|---|
| 4,142,372 | March, 1979 | Kato et al |
| 4,716,739 | January, 1988 | Harris et al |
| 4,817,391 | April, 1989 | Roe et al |
| 4,829,774 | May, 1989 | Wassibauer et al |
| 4,845,958 | July, 1989 | Senda et al |
| 4,894,997 | January, 1990 | Urushizaki et al |
| 4,961,322 | October, 1990 | Oguma et al |
| 5,063,753 | November, 1991 | Woodruff |
| 5,332,547 | July, 1994 | Olson et al |
| 5,355,781 | October, 1994 | Liston et al |
| 5,457,963 | October, 1995 | Cahill-O'Brien et al |
| 6,092,430 | July, 2000 | Liston et al |
| 6,113,671 | September, 2000 | Garrett |
| 6,209,289 | April, 2001 | Cullen et al |
| 6,344,070 | February, 2002 | Banks |
| 6,379,731 | April, 2002 | Brown et al |
| 6,862,980 | March, 2005 | Heil et al |
| 7,208,187 | April, 2007 | Gabler |

BACKGROUND

1. Field of Invention

This invention, the "Invention", is a system for controlling the atmosphere within a container to inhibit the maturation of the produce contained therein by (1) preventing or limiting the formation of Ethylene, which is naturally produced by certain fruits and vegetables, (2) by scrubbing the atmosphere of any Ethylene that does form, (3) by exhausting the atmosphere of any residual Ethylene, (4) by limiting the amounts of Oxygen ($O_2$) and Carbon Dioxide ($CO_2$) to preset limits, and (5) by exhausting excess $O_2$ and $CO_2$. By eliminating, or greatly reducing Ethylene from the atmosphere surrounding the produce, it will arrive at destination in a state very near that in which it was harvested. Because maturation during shipping will be greatly reduced, fruit can be picked later, more developed; therefore, it should be more appealing to the consumer than fruit that is picked before its flavor has fully developed in order to accommodate the effects of maturation during shipping.

Ethylene gas ($C_2H_4$) is an odorless, colorless gas that exists in nature and occurs naturally as fruit and vegetables mature. Not easily detectable, it exists where produce is stored. In nature, the largest producers are plant and plant products (i.e., fruits, vegetables and floral products), which produce Ethylene within their tissues and release it into the surrounding atmosphere. Increased levels of Ethylene contained within a transport container and released by the produce itself serve as a stimulant after re-absorption to initiate the production of more Ethylene. The overall effect is to hasten ripening, aging and eventually spoilage.

The production of Ethylene, depends on the presence of Oxygen ($O_2$) and Carbon Dioxide ($CO_2$) in the atmosphere. By limiting these gases to very small amounts ($O_2<5\%$, $CO_2<15\%$) within a container, the production of Ethylene and its effect on the fruit is limited.

It is envisioned that this system will operate while the produce is being transported within a refrigerated container, utilizing the well-known benefits of refrigeration in sustaining produce quality by slowing its deterioration.

The Invention relies on flushing the atmosphere with Nitrogen as soon as possible after placing the produce in the transport container, and then maintaining the proper level of Nitrogen by allowing it to flow into the controlled area from a tank outside the cargo compartment of the container. The replacement of Oxygen by this gas creates an atmosphere that inhibits the formation of Ethylene. Filters then scrub from the controlled atmosphere any Ethylene that is formed. Finally, the system then periodically exhausts the atmosphere to remove any residual Ethylene and any excess $O_2$ and $CO_2$ above pre-determined optimum concentrations.

2. Comparison of the Invention with Prior Art

There have been previous attempts to establish a controlled atmosphere (CA) within which to store or transport perishable produce. These attempts have resulted in various systems that usually have approached the problem by utilizing a single method to improve or modify the atmosphere within a confined space.

One such system is known as the "NITROL" system (U.S. Pat. No. 3,239,360). This system relies on an ability to periodically purge the atmosphere with Nitrogen based on controls which respond to the Oxygen level within the environment of the shipping container. The only control therefore is based on Oxygen level and does not consider limiting the formation of Ethylene, or removing Ethylene from the atmosphere.

Another system, which has existed since approximately 1960, relies on the use of a seal inside of the container doors. The environment is then flushed with a premixed gas (trade name "TECTROL"). It differs from the NITROL system in that there is no monitoring or control of the environment during shipping other than in respect of temperature. Prior to the container being sealed, hydrated lime is placed within the container to absorb excessive amounts of Carbon Dioxide. The Carbon Dioxide and Oxygen control is not rigidly controlled to a pre-set level.

*****

In 1979, U.S. Pat. No. 4,142,372 was issued to Kato, et al. (the "Kato patent"). The Kato patent described a method of continuously feeding open air into a refrigerated storage room, and using an adsorber, such as zeolite, in the room to obtain an atmosphere suitable for storage of the vegetables and fruits. By passing the continuously fed air through the adsorber, Nitrogen and Oxygen are separated, the Nitrogen desorbed and the Oxygen expelled. The Oxygen lowered air is recycled through the adsorber again along with outside air to repeat the process, and this continues until an Oxygen content of 2-3% by volume is achieved within the refrigerated room.

The Kato patent provides a controlled atmosphere (CA) storage method for vegetables and fruits, which, as compared with the conventional method, enables more rapid decrease of Oxygen content in the atmosphere inside a storage room, more rapid increase to a desired level in the content of a gas component necessary for vegetables and fruits storage;— such as, Carbon Dioxide, and prevention of moisture dissipation from the storage room.

The Kato patent differs from the Invention by only attempting to adjust the Oxygen level in a storage room by repeatedly passing the same air (along with additional outside air) through an adsorber to reduce the Oxygen content, and then expelling the adsorbed Oxygen. It does not establish a method for adjusting both Oxygen ($O_2$) and Carbon Dioxide ($CO_2$) to preset limits, nor does it recognize or attempt to control Ethylene, a major contributor to the maturation of certain produce. The Kato patent is specific to use in a storage room and does not contemplate usage in a transport container.

*****

In 1988, U.S. Pat. No. 4,716,739 was issued to Harris, et al. (the "Harris patent"). The Harris patent was granted for a method and means for transporting produce (preferably at lowered temperatures) where continual monitoring of the Oxygen level of the container atmosphere is carried out. Preferably, the Carbon Dioxide level is also monitored. Automatic adjustment of the Oxygen content and Carbon Dioxide content to the monitoring level is carried out in a sealed container using a positive infusion of ambient air and the scrubbing of the gas atmosphere to which the produce is subjected.

The Harris patent consists of sealing the container, flushing the container with a Nitrogen-rich gas to reduce the Oxygen level, monitoring the temperature, Carbon Dioxide and Oxygen levels within said container, adjusting as necessary the temperature in response to monitoring towards an optimum or predetermined value or range of values, adjusting the Oxygen content by positive infusion of ambient air into the container under the control of an Oxygen monitor in response to such monitoring towards an optimum or predetermined value or range of values, and adjusting the Carbon Dioxide content by passing it through a scrubber to scrub at least some Carbon Dioxide from the atmosphere should it rise above a predetermined value under the control of a monitor in the container.

The Harris patent differs from the Invention by (1) not recognizing the importance of Ethylene in the maturation of certain fruits, or attempting to limit its production, (2) by not scrubbing the atmosphere of any Ethylene that does form, (3) by not expelling any residual Ethylene, (4) and by not providing for the exhaustion of excess O2 and CO2.

*****

In 1989, U.S. Pat. No. 4,817,391 was issued to Roe et al. (the "Roe patent"). The Roe patent was granted for a method and apparatus for producing a CA in an area. The method includes the intermittent removal of Oxygen, Carbon Dioxide, water vapor and Ethylene from the area. The apparatus includes a compressor to increase the pressure of the gases present which are then separated by diffusion across membranes.

The Roe patent pertains to the production of a CA and the production and maintenance of Oxygen and Carbon Dioxide depleted atmospheres for the long term-refrigerated storage of produce.

The Roe patent provides a system for control of atmosphere which operates at cold storage temperatures. The system can remove almost all of the Oxygen from the atmosphere. No Carbon Dioxide is generated by the system itself and in fact Carbon Dioxide generated by ripening produce is removed from the atmosphere by the system. Finally, the system also removes Ethylene gas from the atmosphere.

The system includes an area in which the atmosphere from this area passes through a compressor which raises the pressure to a point where the system can operate. The compressed atmosphere then passes through a gas separator which includes hollow tubes with semi-permeable membranes which separate Nitrogen from Ethylene, Carbon Dioxide and Oxygen. The Nitrogen then flows back to the control atmosphere area. A controlling system allows control of the pressures and gas content throughout the system. There is also a method of hydrating the Nitrogen reintroduced into the controlled atmosphere area.

The Roe patent differs from the Invention by (1) attempting to only remove O2 by exhaustion after separating it from other gasses, (2) not recognizing that Ethylene will continue to be produced by certain fruits, (3) not scrubbing the Ethylene produced, and (4) by relying on a compressor and a gas separator to separate Nitrogen from other gasses and flowing it back into the controlled area. It also does not consider the problems of transporting produce in a controlled atmosphere, but only considers a static area.

*****

On May 16, 1989, U.S. Pat. No. 4,829,774 was issued to Wassibauer, et al. (the "Wassibauer patent"). The Wassibauer patent described a transportable refrigerating container in which the container atmosphere is adjusted to the foodstuffs, stored therein, by feeding the refrigerated atmosphere, optionally together with outside air, to a device that separates and removes water and gases, such as Oxygen, Nitrogen, Carbon Dioxide, Ethylene and Hydrogen Dioxide, whereupon the atmosphere of modified composition is returned to the refrigerating container.

The Wassibauer invention includes molecular sieves, over which the existing atmosphere of the container is passed through the use of a circulating device in order to separate water and gases, means for refrigerating and humidifying the container, sensors, a control unit to adjust the temperature and humidity, a blower to direct the atmosphere discharged from the circulating plant via the refrigerating means and the humidifying means in the direction of the goods stored, the connection of the control unit to all the measuring sensors, a memory chip containing the operating parameters, an input unit for the entry of external data, and the connection of the control unit to the refrigeration unit and to switches of the circulating plant so that it can be switched on for determined periods on detecting deviations of operating parameters from set values.

It is the object of the invention to provide a refrigerating container whose energy requirement is low and in which optimal atmospheric values for the goods stored can be adjusted.

The Wassibauer patent differs from the Invention by (1) not concentrating on Ethylene generated by the carried produce as the primary factor of continued maturity during transportation, (2) by relying on molecular sieves to separate out Nitrogen from other gases and providing it back into the container, (3) by not specifically scrubbing the container atmosphere of any Ethylene that does form, (4) by not exhausting the container atmosphere of any residual Ethylene, and (5) by not exhausting the container atmosphere of excess O2 and CO2.

*****

On Jul. 11, 1989, U.S. Pat. No. 4,845,958 was issued to Senda et al. (the "Senda patent"). The Senda patent described a method for preserving perishable goods by removing from a refrigerating chamber such harmful aging substances as Ethylene, which is released from the perishable goods being preserved in a refrigerating chamber and which causes additional maturation and aging. Adsorption materials which have the capacity to adsorb these harmful aging substances are placed in the chamber. When the perishable goods are horticultural goods such as vegetables, fruits or flowers, activated charcoal is preferable as the above-mentioned adsorption material.

Activated charcoal also has adsorptivity with respect to ethyl alcohol, enabling the use of a high concentration of the latter without the odor of the alcohol adhering to perishable goods and making them unfit for use as food.

In addition, the apparatus of the Senda invention is partitioned by a perforated plate into the cold-air blowout holes of a cooling unit and a preserving chamber for the perishable goods. The cold air passes through the fine pores of the perforated plate and is uniformly supplied to the perishable goods in the preserving chamber, whereby uniform cooling can be performed.

The Senda patent differs from the Invention by (1) not trying to prevent the formation of Ethylene, (2) by not attempting to exhaust any residual Ethylene from the atmosphere of the chamber, (3) by not limiting the amounts of O2 and CO2 in the chamber, and (4) by not exhausting any excess O2 and CO2.

*****

On Jan. 23, 1990, U.S. Pat. No. 4,894,997 was issued to Urushizaki et al. (the "Urushizaki patent"). The Urushizaki patent described a method of storing fruits and/or vegetables immediately after harvest, which comprises the steps of placing said fruits and/or vegetables in an enclosed storage chamber containing a controlled atmosphere consisting of a mixture of gases comprising Oxygen and Carbon Dioxide, said mixture of gases having a total pressure of not lower than 400 Torr and up to 700 Torr, an Oxygen partial pressure of from about 15 Torr to about 145 Torr and a Carbon Dioxide partial pressure of about 15 Torr to about 115 Torr, maintaining the relative humidity of said mixture of gases at not lower than 90% and maintaining the temperature of the mixture of gases at from about 0 to 15 degrees Celsius mixing air and Carbon Dioxide from external sources under controlled pressures and flow rates to prepare a gaseous feed mixture having the same pressure and the same Oxygen and Carbon Dioxide partial pressures as said controlled atmosphere in said storage chamber, and continuously supplying said gaseous feed mixture into said storage chamber while simultaneously exhausting the controlled atmosphere from said storage chamber at the same rate as said gaseous feed mixture is fed into said storage chamber.

This method results in an atmosphere which has a low Oxygen level and a high Carbon Dioxide level and which is slightly subatmospheric.

The Urushizaki patent differs from the Invention by (1) not attempting to limit the formation of Ethylene, (2) by not attempting to scrub the atmosphere of any Ethylene that does form, (3) by not exhausting the atmosphere of any residual Ethylene, and (4) by not attempting to limit the percentage of O2 and CO2 present in the storage chamber.

*****

On Oct. 9, 1990, U.S. Pat. No. 4,961,322 was issued to Oguma et al. (the "Oguma patent"). The Oguma patent described a fresh food storage device in which a storing volume is formed within a box for storing fresh foods such as vegetables, fruits, cereals, meats, eggs, and milk products. It is contemplated that this device will be installed on the floors of homes and stores.

The device houses a temperature detector for detecting the temperature of the gas within the storing volume, a cooling mechanism for cooling the interior of the storing volume, a device for supplying Nitrogen-rich gas into the storing volume, and a controller which activates the cooling mechanism to control the temperature of the interior of the storing volume in response to signals from the temperature detector. The controller also activates the Nitrogen-rich gas supplying device in response to the variation of the gas contents of the storing volume in order to maintain the Nitrogen concentration at a proper level all the time. This inhibits the respiration of the fresh foods stored within, helps to prevent rotting and contributes to keeping the foods in a fresh state. Further, a pressure regulator prevents the leaking of the cooled Nitrogen-rich gas from the interior of the storing volume to the outside.

The device also includes a means for supplying Oxygen-containing gas into the storing volume, when the Oxygen concentration is detected to be below a reference value. It further includes a means for detecting the Carbon Dioxide concentration within said storing volume, wherein said controller has means for activating said Nitrogen-rich gas supplying means when the Carbon Dioxide concentration is found to be above a reference value. Further, a by-pass path connected to the storing room can be installed, and an Ethylene remover can be installed at a position on the by-pass. In this case, the gas within the storing volume is circulated between the by-pass path and the storing volume by means of a pump driven by an actuator.

The Oguma patent differs from the Invention by (1) not recognizing the importance of Ethylene in the maturation process; (2) by treating the removal of Ethylene as almost incidental to the storage process; (3) by not exhausting the atmosphere of any residual Ethylene; and (4) by not contemplating the installation of the device in a trailer intended to transport fresh fruits and vegetables over long distances while maintaining their freshness.

*****

On Nov. 12, 1991, U.S. Pat. No. 5,063,753 was issued to Woodruff (the "Woodruff patent"). The Woodruff patent described an apparatus for storing produce under controlled conditions embodied in a transport container for maintaining produce under controlled conditions during transportation. Nitrogen-rich gas and Carbon Dioxide gas are supplied to the container when required by a system wherein the Nitrogen gas is generated from the ambient air surrounding the container using an air splitter and the carbon-dioxide is generated from a store of dry-ice.

The device contains a substantially sealable container having a hollow interior for containing the produce, a means for generating Nitrogen rich gas by utilizing a compressor to pump ambient air surrounding the container through an air splitter of the membrane type which splits ambient air, under pressure, into its principal constituents of Nitrogen and Oxygen. It also has a means for monitoring the Oxygen content of the interior and then adjusting the operation of the Nitrogen generating apparatus when Oxygen is other than at a predetermined level. In addition, the device contains a means for storage of dry-ice which generates Carbon Dioxide gas. The CO2 is delivered into the container when the monitored level of the gas falls below a predetermined level. Further the device has a pressure relief valve for venting Carbon Dioxide gas from decomposing dry-ice from said insulated box to the atmosphere surrounding said container.

The Woodruff patent provides an apparatus for carrying out the above operation which comprises: a substantially sealable container; means to monitor the level of Oxygen within the container; means to generate a Nitrogen-rich gas from the ambient air surrounding the container and direct the gas into the container in response to an Oxygen level other than at a predetermined level; means to monitor the Carbon Dioxide level within the container; dry-ice storage means; and operative means to direct Carbon Dioxide from the dry-ice storage means into the container in response to monitoring a Carbon Dioxide level beneath a predetermined level.

The Woodruff patent differs from the Invention by (1) not recognizing the importance of Ethylene to the maturation of fruits and vegetables; (2) by not scrubbing the atmosphere of any Ethylene that does form; and (3) by not exhausting the atmosphere of any residual Ethylene.

*****

On Jul. 26, 1994, U.S. Pat. No. 5,332,547 was issued to Olson et al. (the "Olson patent"). The Olson patent described a device for maintaining a controlled atmosphere within a sealed container which utilizes permeable membrane technology to control the Oxygen and Carbon Dioxide levels within the container when used to transport perishable foods, such as fruits, produce, or grain.

An oilless compressor is used in conjunction with the device so as to not subject the permeable membranes to the derogatory effects associated with the presence of oil within an airstream that circulates through the permeable membranes. Additionally, the compressor is preferably mounted within the sealed container so as to not subject the compressor to the effects of temperature variation and corrosive marine environments. The device further includes an air sampling system which is used to periodically measure the Oxygen and Carbon Dioxide levels within the container. Control logic is included with the system which is operable to adjust the Oxygen and Carbon Dioxide levels in accordance with the particular readings obtained by the sampling system.

The system comprises a sealed transport container that has an inlet for outside ambient air, a compressor, a gas separation means, a gas analyzing means to determine the Oxygen level within the container, and a programmable control means that interfaces with the compressor, gas separation means, and gas analyzing means. The control is programmed to increase the Oxygen level of gas inside said container in response to an electrical signal generated by said gas analyzing means indicating that the Oxygen level of the gas within the container as determined from gas samples is below a predetermined Oxygen range, and to decrease the Oxygen level of the gas inside said container in response to an electrical signal generated by the gas analyzing means indicating that the Oxygen level within said container as determined from the gas samples to be above the predetermined Oxygen range. The control is also programmed to increase the Carbon Dioxide level of the gas inside said container in response to an electrical signal generated by said gas analyzing means indicating that the Carbon Dioxide level of the gas within said container as determined from gas samples is below a predetermined Carbon Dioxide range; and to decrease the Carbon Dioxide level of the gas within said container in response to an electrical signal generated by said gas analyzing means indicating that the Carbon Dioxide level within said container is above the predetermined Carbon Dioxide range.

The Olson patent differs from the Invention by (1) not recognizing and attempting to control the formation of Ethylene, (2) by not scrubbing the atmosphere of any Ethylene that does form, and (3) by not exhausting the atmosphere within the container of any residual Ethylene that does form.

*****

On Oct. 18, 1994, U.S. Pat. No. 5,355,781 was issued to Liston et al. (the "Liston patent"). The Liston patent described a system for maintaining a controlled Oxygen atmosphere within a transport container vessel, such as a bulk rail car, through the use of permeable membrane technology. It includes an air-sampling system which is used to continuously measure the Oxygen levels within the rail car so as to provide verification that the Oxygen levels are maintained at 5% or less to kill insects, larvae, or eggs which may be within the bulk materials transported by rail car.

As an alternative to the utilization of chemical pesticides to treat the stored food products during transport, it has been found that lowering the Oxygen level within the transport container vessel to 5% or less and maintaining this level for extended periods of time has a toxic effect on the insects, larvae, and eggs found in the products. It has also been shown that a small percentage of Carbon Dioxide in combination with a low Oxygen level can decrease the kill time, thereby increasing the effectiveness of the low Oxygen levels within the container vessel. An optional Carbon Dioxide supply from a liquid cylinder can also be used in conjunction with the Nitrogen generation system.

The Liston patent recognizes the health risks associated with the use of pesticides by providing a replacement for such pesticides in the form of a system utilizing Nitrogen-generating membranes to create an atmosphere within the transport container vessel not exceeding a 5% Oxygen level.

The system also includes a gas-separation means being collectively operable to maintain an Oxygen level within said container not exceeding 5%; and a gas-analyzer means for monitoring and recording the Oxygen levels of gas within the container; a controller assembly adapted to selectively draw gas from within said container into said gas-analyzer means; a control valve; a pump electrically interfaced between the control valve and said gas-analyzer means wherein activation of said pump concurrently with the actuation of said control valve draws gas from within the container into the gas-analyzer means to monitor the Oxygen level of gas exiting said gas-separation means. The gas analyzer will also monitor the Carbon Dioxide levels within the container.

The Liston patent differs from the Invention by (1) not attempting to limit the aging of produce transported within a container; (2) by not attempting to limit the formation of Ethylene; (3) by not attempting to scrub the container atmosphere of Ethylene; (3) by not exhausting the container atmosphere of any Ethylene that does form; (4) by not attempting to limit O2 and CO2 within the container to amounts that would optimize the freshness of the produce being transported; and (5) by concentrating on decreasing insects and larvae within the container.

*****

On Oct. 17, 1995, U.S. Pat. No. 5,457,963 was issued to Cahill-O'Brien et al. (the "Cahill-O'Brien patent"). The Cahill-O'Brien patent described a system for controlling the atmosphere within a confined space. The invention relates to a controlled atmosphere system for a refrigerated container and specifically to a system for regulating the amount of Nitrogen, Oxygen, and Carbon Dioxide inside a refrigerated container resulting in an atmospheric composition that extends post harvest shelf life or quality of fruits and vegetables.

The purpose of a controlled atmosphere system is to control the amount of Oxygen and Carbon Dioxide inside the refrigerated container to change the rate of ripening of the produce stored in the container. The system controls the amount of Oxygen (O2) and Carbon Dioxide (CO2) by replacing them with Nitrogen (N2).

The system includes an air compressor, filter, air heater, a separator for dividing air into streams of Oxygen and Nitrogen, and flow control valves for varying the purity of the Nitrogen stream. The system also includes sensors for indicating the temperature leaving the heater and the temperature within the confined space, a sensor to indicate the pressure upstream of the control valves, an Oxygen sensor and a Carbon Dioxide sensor. It also has an electrical controller to direct the operation of these components, and a display of the status of each.

The method includes the steps of energizing the system and simultaneously operating the electrical control to perform the steps of: (1) operating the compressor to an on or off position responsive to inputs from the Oxygen sensor and the Carbon Dioxide sensor; (2) operating the flow control to achieve setpoint Oxygen and Carbon Dioxide levels in the atmosphere, in response to inputs from the Oxygen sensor and the Carbon Dioxide sensor; (3) operating the air heater to maintain a preset value; (4) monitoring the Oxygen sensor, and, compensating the output when a predetermined temperature of the atmosphere is indicated; (5) monitoring the Carbon Dioxide sensor, and compensating the output when a predetermined change in the temperature of the Carbon Dioxide sensor occurs; and (6) monitoring system components, and, indicating on the display when unsafe or out of range conditions occur.

The membrane separator has an Oxygen outlet which extends from the separator through the barrier to discharge Oxygen and other gases to the outside atmosphere. The Nitrogen outlet also extends through the barrier into the condenser section where it communicates with the flow control or metering valve system. Located in the Nitrogen outlet conduit is a pressure transducer which provides a pressure input to the controlled atmosphere controller. The flow control valves are selectively opened and closed in response to the control algorithm from the controlled atmosphere system controller to adjust the purity of Nitrogen generated by the membrane.

The Cahill-O'Brien Patent differs from the Invention by (1) not recognizing the impact of Ethylene on the maturation of some fruits and vegetables; (2) by not attempting to limit the formation of Ethylene; (3) by not scrubbing the atmosphere of any Ethylene that does form; (4) by not exhausting the container atmosphere of any residual Ethylene; and (5) by only exhausting excess Oxygen that has been generated at the separator membrane and not attempting to exhaust any excess Oxygen that may already be in the container.

*****

On Jul. 25, 2000, U.S. Pat. No. 6,092,430 was issued to Liston et al. (the "Liston patent"). The Liston patent described a controller for use in a system employing selective permeable membrane technology to maintain a controlled atmosphere within a refrigerated container. The controller is electrically interfaced to an Oxygen and Carbon Dioxide sensing device, and comprises an analyzer for Carbon Dioxide (CO2) analysis, an analyzer for Oxygen (O2) analysis, and a bypass valve for the membrane to control the amount of Oxygen and Carbon Dioxide gas entering into the container.

The Liston patent differs from the Invention by (1) not recognizing the importance of Ethylene to the maturation of some fruits and vegetables; by (2) not attempting to limit the formation of Ethylene; (3) by not scrubbing the atmosphere of any Ethylene that does form; (4) by not exhausting the container atmosphere of any residual Ethylene; and (5) by limiting itself to only attempting to control the amounts of Oxygen and Carbon Dioxide within the container.

*****

On Sep. 5, 2000, U.S. Pat. No. 6,113,671 was issued to Garrett (the "Garrett patent"). The Garrett patent described a system for controlling the atmosphere within a container comprising a plurality of separate but inter-communicating adsorbent beds arranged in a single series for the selective adsorption at least in part and in a predetermined order of any water vapor, ethylene, carbon dioxide and nitrogen present in the atmosphere, means for controlling the flow of atmosphere between successive adsorbent beds, means for isolating and venting at least some of the adsorbent beds to ambient atmosphere, means for urging the atmosphere under pressure towards the adsorbent beds, means for purging the carbon dioxide-selective bed, the ethylene-selective bed and the water vapor-selective bed with nitrogen desorbed from the nitrogen-selective adsorbent bed, and means for returning the controlled atmosphere to the container.

The Garrett patent differs from the present invention by (1) by not scrubbing the atmosphere of any Ethylene that does form; and (2) by not contemplating the installation of the device in a trailer intended to transport fresh fruits and vegetables over long distances while maintaining their freshness. It is the combination of inhibiting the formation of Ethylene by replacing most of the atmosphere with Nitrogen, scrubbing the atmosphere, and then exhausting the atmosphere of any residual Ethylene that separates the present invention from its predecessors.

*****

On Apr. 3, 2001, U.S. Pat. No. 6,209,289 was issued to Cullen et al (the "Cullen patent"). The Cullen patent described to a composition for and a method of absorbing oxygen and releasing carbon dioxide in a container having a product and a high moisture environment from which oxygen was flushed and which contains carbon dioxide and some oxygen. The Cullen patent differs from the present invention by (1) not recognizing the impact of Ethylene on the maturation of some fruits and vegetables; (2) by not attempting to limit the formation of Ethylene; (3) by not scrubbing the atmosphere of any Ethylene that does form; (4) by not exhausting the container atmosphere of any residual Ethylene; (5) by limiting itself to only attempting to control the amounts of Oxygen and Carbon Dioxide within the container; (6) by not concentrating on Ethylene generated by the carried produce as the primary factor of continued maturity during transportation; and (7) by not contemplating the installation of the device in a trailer intended to transport fresh fruits and vegetables over long distances while maintaining their freshness.

*****

On Feb. 5, 2002, U.S. Pat. No. 6,344,070 was issued to Banks (the "Banks patent"). The Banks patent described a method of removing individual gas components of a mixture of gases within a controlled environment container using apparatus which comprises first and second chambers which are arranged in parallel for the gas mixture to flow through them from their inlet ends to their outlet ends and which contain adsorbent material with different affinities for the gas components of the mixture.

The Banks invention provides a technique for separating components of a mixture of gases in which the purge gas is supplied from the chamber that is in use for separation to the chamber that is to be regenerated in a pulse.

The Banks patent differs from the present invention by (1) not recognizing the impact of Ethylene on the maturation of some fruits and vegetables; (2) by not attempting to limit the formation of Ethylene; (3) by not scrubbing the atmosphere of any Ethylene that does form; (4) by concentrating on the control of the amounts of Oxygen and Carbon Dioxide within the container; (5) by not concentrating on Ethylene generated by the carried produce as the primary factor of continued maturity during transportation; and (6) by not add Nitrogen to the container to retard the generation of Ethylene.

*****

On Apr. 30, 2002, U.S. Pat. No. 6,379,731 was issued to Brown et al (the "Brown patent"). The Brown patent described a method for filling a sealed bag of fresh produce with a desired gas or gas mixture, attaching a closure device to an open end of the bag, the closure device, placing the bag with its attached closure device entirely inside a vacuum chamber, closing the chamber to the outside atmosphere, drawing a vacuum within the chamber sufficient to reduce the pressure inside below atmospheric pressure to open at least one opening of the closure device, filling the chamber and the interior of the bag to or near to atmospheric pressure, and sealing the desired gas mixture inside the bag of fresh produce.

The Brown patent differs from the Invention by (1) not recognizing the importance of Ethylene to the maturation of some fruits and vegetables; by (2) not attempting to limit the formation of Ethylene; (3) by not scrubbing the atmosphere of any Ethylene that does form; (4) by limiting itself to a discussion of a method to flush a sealed bag of produce with a gas such as nitrogen; and (5) by not recognizing that Ethylene will continue to form at some level inside the sealed bag of produce, and therefore must be periodically removed.

*****

On Mar. 8, 2005, U.S. Pat. No. 6,862,980 was issued to Heil et al (the "Heil patent"). The Heil patent describes a food preservation container and filter that contains a filter for absorbing ethylene gas and moisture and emitting carbon dioxide that can be removably coupled to a container. The container can have vent openings to allow air to circulate to prevent excess condensation, or the container can be any type of flexible, semirigid, or rigid produce container such as a plastic bag, a refrigerator or a typical plastic container. The contents of the filter are in vapor contact with the internal environment of the container such that it can absorb ethylene gas and moisture in the container and release carbon dioxide into the container to retard the ripening process of the produce stored in the container.

An embodiment of the inventive container of the invention is a non-refrigerator or a refrigerated container that allows a minimal amount of gas exchange to occur with the exterior environment to prevent condensation.

In another aspect, the container also includes a filter which is removably coupled to the container.

Still further, the underside of the filter that is exposed to the inside of the container is made of a type material which is a moisture barrier. In still a further aspect, one of the chambers of the filter holds an ethylene control compound such as potassium permanganate impregnated material preferably a porous or multi-channeled material and the other chamber holds moisture absorbing, and $CO_2$ generating compounds. In one embodiment, the filter fits on the lid (or on the side, top and bottom) of a container or on the lid (on or the side, top and bottom) of a chamber on compartment built into a refrigerator or other appliances.

The Heil patent differs from the Invention by (1) directing its application to consumer or home use; (2) by not discussing the use of Nitrogen to limit the production of Ethylene; (3) by concentrating on the generation of CO2 to reduce the formation of Ethylene; and (4) by not periodically flushing the container of Ethylene that does form.

*****

On Apr. 24, 2007, U.S. Pat. No. 7,208,187 was issued to Gabler (the "Gabler patent"). The Gabler patent described a method of adjusting a controlled atmosphere for the storage of plant products in at least one storage or transport space, comprising: a) measuring a concentration of a trace gas at least twice at different times, wherein the trace gas is produced by the plant products, and wherein the trace gas represents less than 1% of the controlled atmosphere; b) determining a production rate, wherein the production rate comprises the degree of change of the concentration of the trace gas from at least two measurements of the concentration of the trace gas taken at different times; and c) adjusting the composition of the controlled atmosphere according to the production rate.

The Gabler patent differs from the present invention by (1) by not attempting to limit the formation of Ethylene; (2) by not scrubbing the atmosphere of any Ethylene that does form; (3) by not exhausting the container atmosphere of any residual Ethylene; and (4) by limiting itself to only attempting to control the amounts of Oxygen and Carbon Dioxide within the container.

SUMMARY

The Invention builds on the contributions of prior art, but differs generally in that it combines five major approaches into one system to achieve what no one approach has been able to do—i.e., to inhibit the maturation of selected fresh fruits and vegetables during transportation so that the produce arrives in nearly the same condition as when it was first subjected to this Invention process.

It does this by controlling the atmosphere within a container by (1) preventing or limiting the formation of Ethylene, (2) by using Ethylene filters to scrub the atmosphere of any Ethylene that does form, (3) by exhausting the atmosphere of any residual Ethylene, (4) by limiting the amounts of Oxygen (O2) and Carbon Dioxide (CO2) to preset limits, and (5) and by exhausting excess O2 and CO2.

The Invention process will eliminate or greatly reduce Ethylene from the atmosphere surrounding the produce, so that it will arrive at destination in a state very near that in which it was placed in the controlled atmosphere. Because maturation during shipping will be greatly reduced, fruit can be picked later and more developed, and therefore, it should be more appealing to the consumer than fruit picked before its flavor has fully developed to accommodate the effects of maturation during shipping.

DESCRIPTION OF THE DRAWINGS

The drawings consist of FIGS. A, B, C, and D. There is also an Equipment List which sets forth the equipment referred to within the drawings.

The Equipment List sets forth the pieces of equipment and in which drawing(s) they are depicted.

EQUIPMENT LIST

Figure 1:
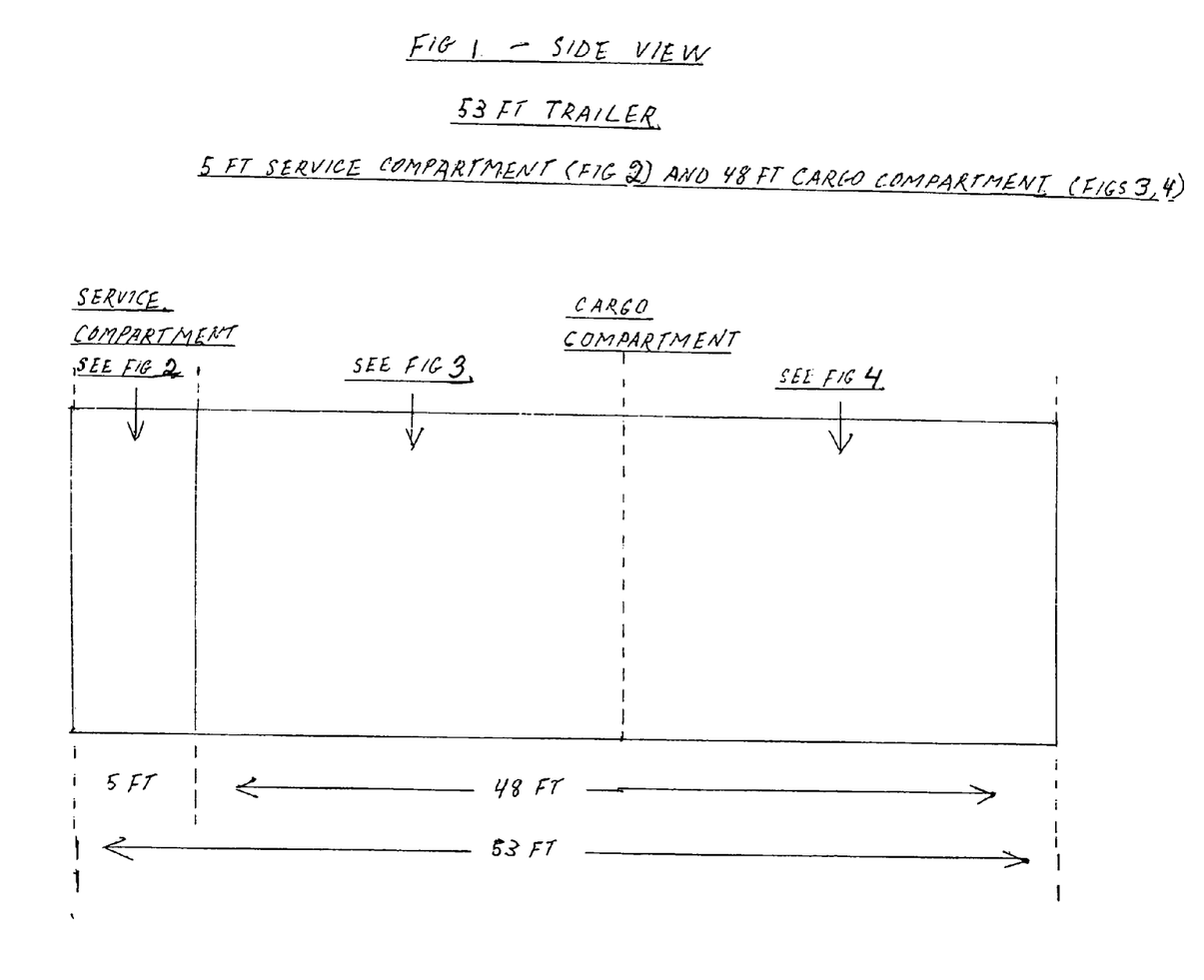
FIG. 1 depicts a side view of a truck trailer that is composed of a service compartment and a cargo compartment.
Figure 2:
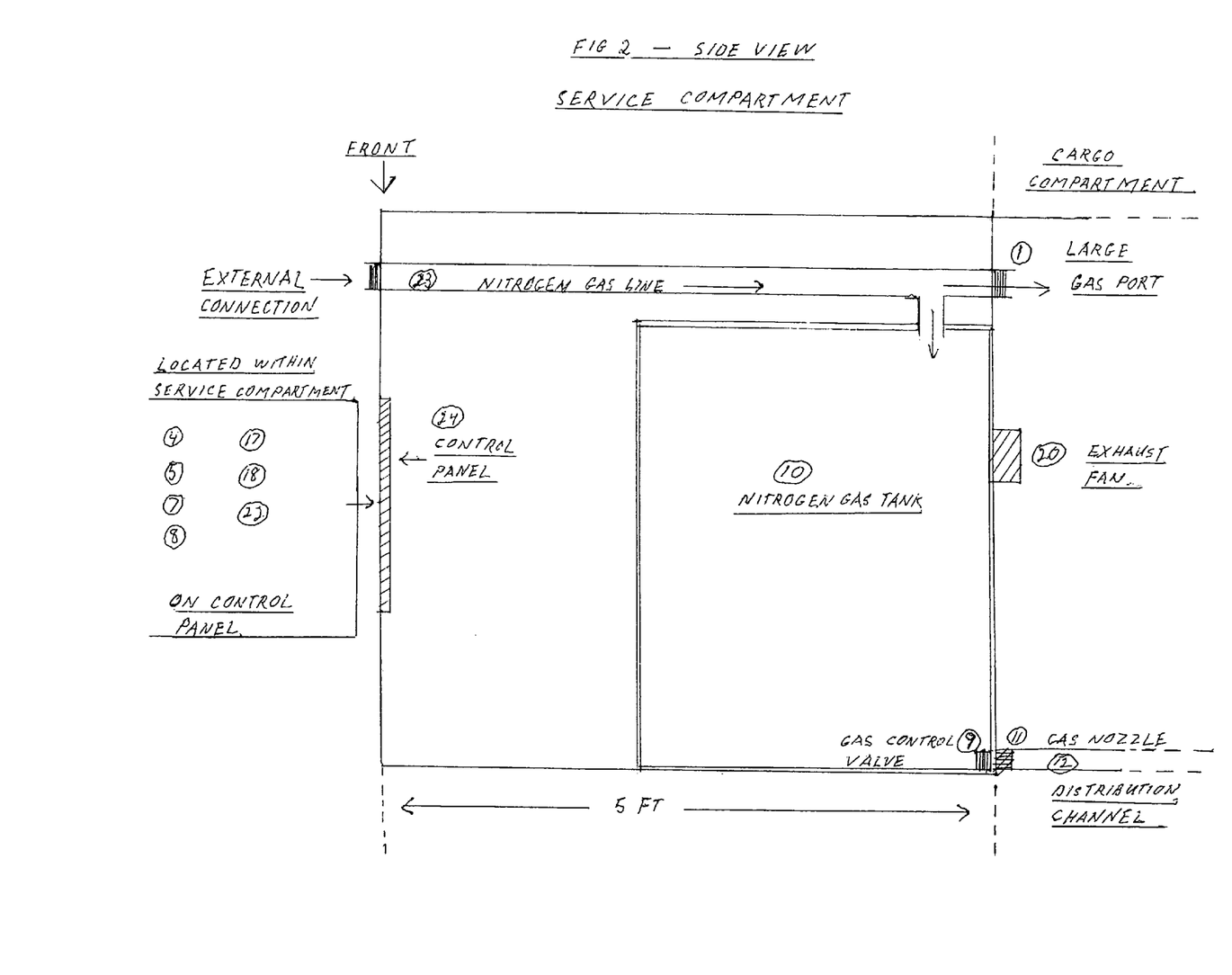
FIG. 2 is a side view that depicts in detail the service compartment and the equipment housed therein.
Figure 3:
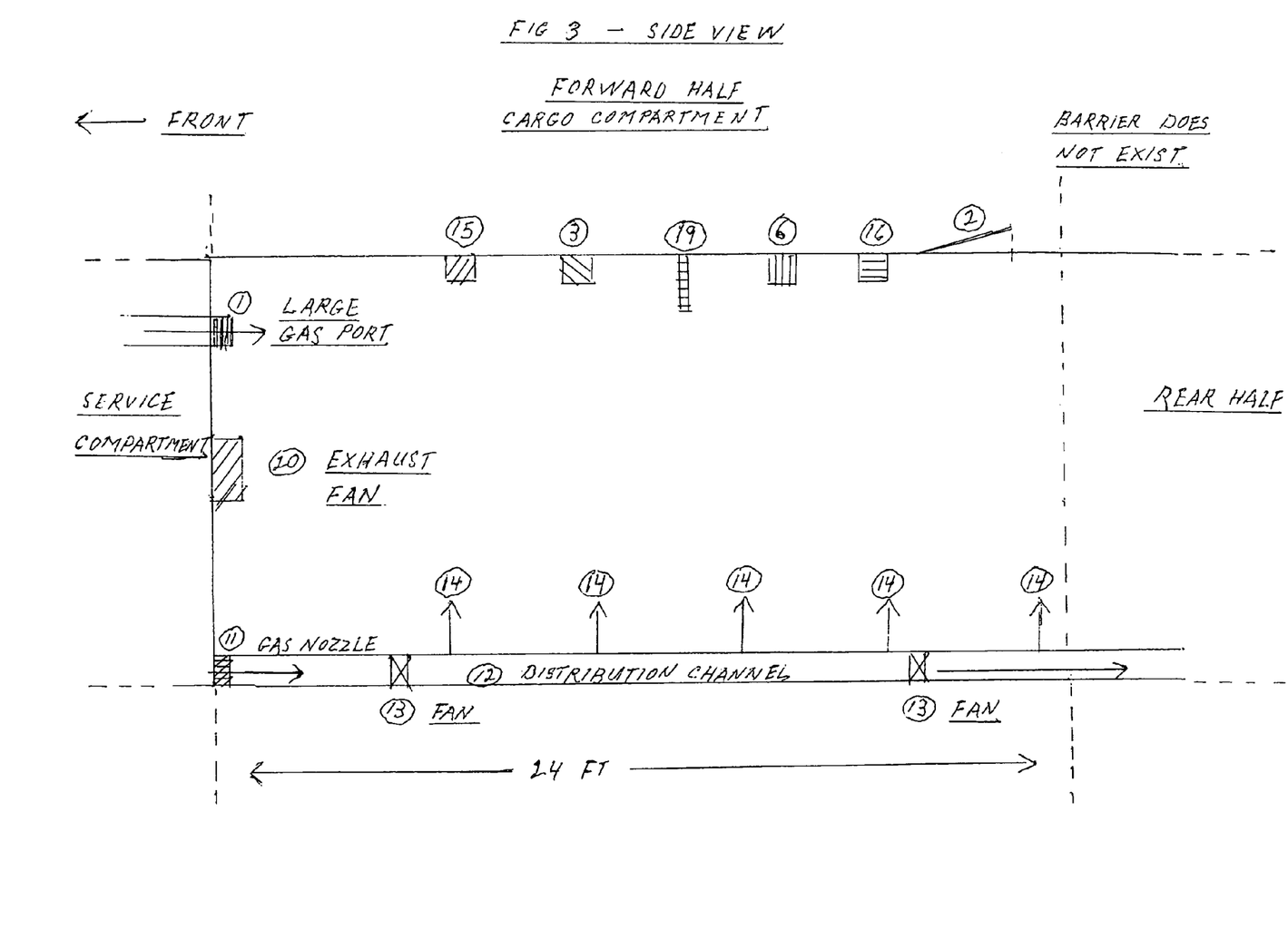
FIG. 3 is a side view that depicts the forward half of the cargo compartment and the equipment housed therein. For sake of illustration, it also shows a dashed vertical line that does not actually exist, but which is used to denote half the length of the compartment.
Figure 4:
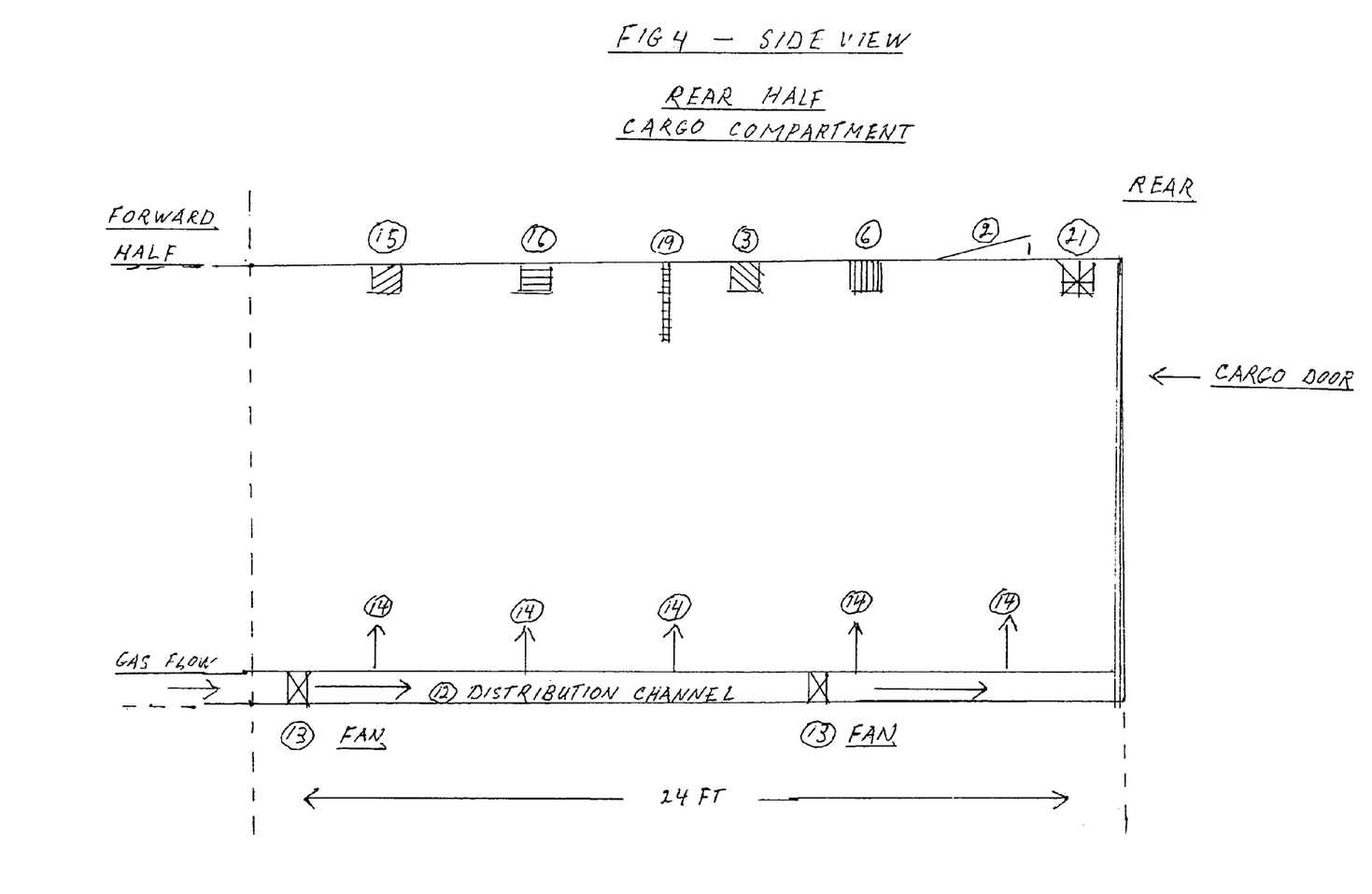
FIG. 4 is a side view that depicts the rear half of the cargo compartment and the equipment housed therein. It also shows the same dashed vertical line shown in Drawing C. Some of the equipment housed in the forward half of the cargo compartment will also be housed in the rear half.

|     | Equipment | Location |
| --- | --- | --- |
| 1. | Large Gas Port | FIGS. B, C |
| 2. | Exhaust Port | FIGS. C, D |
| 3. | Nitrogen Sensor | FIGS. C, D |
| 4. | Large Gas Port Controller | FIG. B |
| 5. | Exhaust Port Controller | FIG. B |
| 6. | Ethylene Sensor | FIGS. C, D |
| 7. | Ethylene Analyzer | FIG. B |
| 8. | Nitrogen Controller | FIG. B |
| 9. | Gas Control Valve | FIG. B |
| 10. | Nitrogen Gas Tank | FIG. B |
| 11. | Gas Nozzle | FIGS. B, C |
| 12. | Distribution Channel | FIGS. C, D |
| 13. | Channel Fans | FIGS. C, D |
| 14. | Gas Ports | FIGS. C, D |
| 15. | Oxygen Sensors | FIGS. C, D |
| 16. | Carbon Dioxide Sensors | FIGS. C, D |
| 17. | Oxygen Analyzer | FIG. B |
| 18. | Carbon Dioxide Analyzer | FIG. B |
| 19. | Ethylene Filters | FIGS. C, D |
| 20. | Exhaust Fan | FIG. C |
| 21. | Door Lock Sensor | FIG. D |
| 22. | Door Lock Controller | FIG. B |
| 23. | Nitrogen Gas Line | FIG. B |
| 24. | Control Panel | FIG. B |

DESCRIPTION OF THE INVENTION

1. A five foot deep service compartment at the front of a 53 foot truck trailer will house a Nitrogen gas tank, control monitors, analyzers, controller-actuators, tubing and valves.

A rapid flow of Nitrogen gas from an external source will be pumped through a connection in the exterior forward wall of the service compartment by way of a gas line and a large port into a gas tank, and from there it can be pumped through a series of valves and tubing to a gas port on the forward wall of the cargo compartment. The gas tank will have reinforced steel walls and will be situated in the middle of the service compartment and offset from the top, forward and side walls to lessen the effect of the exterior temperature on the pressurized gas.

In addition, there will be a second large gas port that will allow for the rapid flow of Nitrogen from the external source through the connection in the exterior forward wall of the service compartment and then through the gas line into the forward wall of the cargo compartment. By utilizing this port, the ambient air within the cargo area will be quickly converted to a Nitrogen-rich atmosphere that will minimize the natural maturation process of the produce placed there.

Thereafter, the intermittent addition of Nitrogen to maintain a pre-selected percentage within the cargo area, plus cleansing of the cargo area atmosphere by Ethylene filters, plus the periodic elimination of Ethylene, Oxygen and Carbon Dioxide through the operation of the exhaust ports will work together to create and maintain an atmosphere that will allow selected produce to be shipped over long durations and arrive appearing and tasting as fresh as the day it was placed in the container.

The service compartment will also house analyzers which will receive information from sensors within the cargo compartment and utilize these to determine the percentage of Nitrogen, Oxygen and Carbon Dioxide in that atmosphere.

The analyzers will send a signal to a controller, also housed within the service compartment, to actuate the release of Nitrogen via the control valves into the cargo compartment until the analyzers recognize that the predetermined desired level has been achieved.

The service compartment will also house a master control panel which will monitor the atmosphere within the cargo compartment and allow for manual direction for the release of Nitrogen gas, and for the operation of the exhaust ports. The controller for the exhaust ports will also be housed there. The control panel and service compartment will be accessible through an exterior door. The board will also be electronically connected to a duplicate control panel within the tractor cab that will allow the driver to monitor and manually control the atmosphere within the cargo container.

2. A 48 foot long cargo compartment will be adjacent to the service compartment. The walls—sides, ceiling, and floor—will be highly insulated to minimize loss of container air into the atmosphere. Access will be through doors at the rear which will be fitted to further minimize loss. Exhaust ports will allow the container air to be discharged either automatically by operation of the exhaust port controller, or upon command of the driver whenever the sensors detect that the level of Ethylene, Oxygen or Carbon Dioxide has reached a pre-determined limit. The cargo area will also contain Ethylene filters to remove Ethylene naturally generated by the produce that will be housed there. The floor of the container will have distribution channels on both sides which will carry the Nitrogen gas along the length of the cargo compartment. A gas nozzle at the forward wall of the cargo area will inject the Nitrogen gas into the distribution channel where it will be propelled down the channel by fans located just forward of the nozzles. The gas will then pass into the cargo area through gas ports located along the length of the distribution channels.

Despite the establishment of a Nitrogen rich environment within the cargo area to inhibit the release of Ethylene by the produce contained therein, and despite the cleansing carried out by the Ethylene filters, it is envisioned that some Ethylene, Oxygen and Carbon Dioxide will be added to the atmosphere within the cargo area. Since their presence hastens ripening, aging and eventually spoilage, they should be eliminated or reduced to acceptable levels. Therefore, the atmosphere within the cargo area will be intermittently exhausted through the operation of exhaust ports until acceptable levels are reached, and the air replaced by Nitrogen through the distribution channels.

The addition of Nitrogen and the intermittent exhaustion of the cargo area will continue until the produce reaches its destination.

Upon arrival at destination, the system will be shut down and a signal will be sent to a controller to open the exhaust ports to allow ambient air to enter the cargo container. This will allow the Oxygen content to rise to a life sustaining level.

To ensure that the cargo area is safe to enter at destination, a door lock sensor will be located at the rear of the compartment that will measure the percentage of Oxygen in the container atmosphere. The sensor will be connected to a controller located in the service compartment. The cargo access door will remain locked until a life sustaining level of Oxygen has been achieved and the signal forwarded to the controller, which will release the lock.

OPERATION OF THE INVENTION

1. After the produce is loaded into the cargo compartment and the doors closed and sealed, Nitrogen gas will be rapidly pumped through the Nitrogen gas line 23 into the Nitrogen gas tank 10, and also through the Nitrogen gas line and the large gas port 1 into the cargo compartment. The ambient air within the compartment will be discharged through the exhaust ports 2, located in the ceiling of the cargo area. When the Nitrogen level within the compartment reaches approximately 85% to 90%, as determined by sensors 3, also located in the ceiling of the cargo area, a signal will be sent to the large gas port controller 4 and to the exhaust port controller 5, both located in the service compartment on the control panel 24, and the addition of Nitrogen will be stopped and the exhaust ports closed. At this point, the system will be activated, and the sensors, analyzers and controllers will take over and maintain the level of Nitrogen until destination.

2. The Ethylene sensors 6, located in the cargo area ceiling, will constantly monitor the Ethylene within the cargo container and report the data to an Ethylene analyzer 7, located in the service compartment on the control panel, which will determine if the level of Ethylene has reached a point that would necessitate the addition of Nitrogen to the container to slow down the maturation process. If so, an electronic signal will be sent to a Nitrogen controller 8, located in the service compartment on the control panel, to actuate the flow of Nitrogen into the cargo area. The controller will cause the gas control valve 9 on the Nitrogen tank 10, located in the service compartment, to open allowing the pressurized gas to flow through nozzles 11, located in the lower wall between the service compartment and the cargo area, into the cargo container via a distribution channel 12 in the floor of the container. The gas will be pushed through the channel by pressure created by fans 13, and exit into the container via ports spaced along the length of the channel 14.

3. Oxygen sensors 15 and Carbon Dioxide sensors 16 will be located in the cargo area ceiling. When the Oxygen analyzer 17 and the Carbon Dioxide analyzer 18, both located in the service compartment on the control panel, determine that a pre-selected level has been achieved, a signal will be sent to the exhaust port controller to open the ports and exhaust these gases. A signal will also be sent to the Nitrogen controller to cause more Nitrogen to be released into the cargo area. When the sensors determine that the levels of Oxygen and Carbon Dioxide have been reduced to an acceptable level, and the level of Nitrogen is at the desired point, the exhaust ports will be signaled to close and the Nitrogen controller will be signaled to stop the flow of gas.

4. Two Ethylene filters 19, located at the ceiling, will be spaced to allow for even coverage of the cargo area. They will absorb Ethylene that is generated by the produce to further reduce the effect of this naturally generated gas on the maturation process.

5. The two exhaust ports will be opened intermittently to allow for the elimination of any Ethylene that remains after the operations described in paragraphs 1 through 4. These ports will be operated by the exhaust port controller located in the service compartment on the control panel. Acting on information provided by the Ethylene sensors, the Ethylene analyzer will signal the controller to open the exhaust ports when the Ethylene rises to a significant level, and to close the exhaust ports when it determines that the level of Ethylene has been reduced to a predetermined, permissible level.

6. The operations described in paragraphs 2 through 5 will continue until the container reaches its destination. At that time, the driver will cause a signal to be sent to the Nitrogen controller to stop the flow of gas into the container. The driver will also signal the exhaust port controller to open the exhaust ports. An exhaust fan 20, mounted in the forward wall of the cargo area, will also be activated by the driver to speed the reduction of Nitrogen in the cargo area and its replacement by ambient air from the atmosphere.

7. A door lock sensor located at the rear of the compartment 21 will measure the percentage of Oxygen in the container atmosphere. The sensor will be connected to a door lock controller 22 located in the service compartment on the control panel. The cargo access door will remain locked until a life sustaining level of Oxygen has been achieved and the signal forwarded to the controller, which will release the lock, allowing the cargo doors to be opened. A warning light will be activated to stop entry into the cargo area until the Nitrogen and Oxygen sensors confirm that the ambient air within the cargo area is safe to breathe. After a final check by the driver using a portable Oxygen sensor to assure sufficient Oxygen within the cargo area to allow humans to safely enter, the cargo will be released for unloading.

8. All of the sensors described in paragraphs 1 through 7 will be capable of being monitored at the control panel located in the service compartment, and also in the tractor where a display unit and control switches will be available to the driver. At either point, the driver may cause the flow of Nitrogen to start or stop, operate the exhaust ports or release the cargo door locks.

What is claimed is:

1. A method for maintaining fresh produce in a near "just harvested" state by (1) filling a sealed truck trailer cargo compartment with Nitrogen while exhausting the existing atmosphere until Nitrogen sensors recognize that the compartment has reached the desired concentration of Nitrogen; (2) scrubbing the atmosphere within the container of any Ethylene that does form by the use of commercially available Ethylene scrubbers; (3) periodically exhausting the atmosphere and replacing it with Nitrogen from a tank within a service compartment; (4) limiting the amount of Oxygen in the cargo compartment through the use of Oxygen sensors and an Oxygen analyzer that will signal a gas control valve and the exhaust port controller to cause the atmosphere to be exhausted through an exhaust ports and replaced with Nitrogen from the tank within the service compartment; (5) limiting the amount of Carbon Dioxide in the cargo compartment through the use of Carbon Dioxide sensors and a Carbon Dioxide analyzer that will signal the gas control valve and the exhaust port controller to cause the atmosphere to be exhausted through the exhaust ports and replaced with Nitrogen from the tank within the service compartment.

2. The method of claim 1 wherein the truck trailer is divided into two compartments: the service compartment and the cargo compartment.

3. The method of claim 2 wherein the service compartment includes a control panel, the Nitrogen gas tank, a Nitrogen gas line, and a gas control valve.

4. The method of claim 3 wherein the control panel includes a large gas port controller, the exhaust port controller, an Ethylene analyzer, a Nitrogen controller, the Oxygen analyzer, the Carbon Dioxide analyzer, and a door lock controller.

5. The method of claim 2 wherein the cargo compartment includes a large gas port, exhaust ports, the Nitrogen sensors, Ethylene sensors, a gas nozzle, a distribution channel, channel fans, gas ports, the Oxygen sensors, the Carbon Dioxide sensors, Ethylene filters, an exhaust fan, and a door lock sensor.

6. A method of claim 2 wherein the cargo compartment includes a safe entry control comprised of a door lock sensor that will measure when the percentage of Oxygen within the cargo compartment reaches a life sustaining level, and thereupon signal the a door lock controller to allow entry into the cargo compartment.

* * * * *